US 7,048,186 B1

(12) United States Patent
Chandler et al.

(10) Patent No.: US 7,048,186 B1
(45) Date of Patent: May 23, 2006

(54) VOTING APPARATUS AND METHOD

(75) Inventors: Dave Chandler, Livermore, CA (US); Dave Conroy, San Jose, CA (US)

(73) Assignee: Leapfrog Enterprises, Inc., Emeryville, CA (US)

( * ) Notice: Subject to any disclaimer, the term of this patent is extended or adjusted under 35 U.S.C. 154(b) by 462 days.

(21) Appl. No.: 10/024,959

(22) Filed: Dec. 18, 2001

Related U.S. Application Data (60) Provisional application No. 60/258,097, filed on Dec. 22, 2000.

(51) Int. Cl.
*G06F 17/60* (2006.01)

(52) U.S. Cl. ....................................................... 235/386
(58) Field of Classification Search ................. 235/386, 235/385, 487, 489, 456
See application file for complete search history.

(56) References Cited

U.S. PATENT DOCUMENTS

| | | | | |
|---|---|---|---|---|
| 3,944,788 A | * | 3/1976 | Comisar et al. ............... | 235/54 |
| 4,136,336 A | | 1/1979 | Abe et al. | |
| 4,641,240 A | | 2/1987 | Boram | |
| 4,641,241 A | | 2/1987 | Boram | |
| 4,717,177 A | | 1/1988 | Boram | |
| 4,802,092 A | | 1/1989 | Harte | |
| 5,278,753 A | | 1/1994 | Graft, III | |
| 5,283,558 A | | 2/1994 | Chan | |
| 5,313,051 A | * | 5/1994 | Brigida et al. ............... | 235/375 |
| 5,386,219 A | * | 1/1995 | Greanias et al. ............ | 345/174 |
| 5,475,401 A | * | 12/1995 | Verrier et al. ................ | 345/179 |
| 5,485,176 A | | 1/1996 | Ohara et al. | |
| 5,506,375 A | | 4/1996 | Kikuchi | |
| 5,583,329 A | | 12/1996 | Davis, III et al. | |
| 5,635,726 A | * | 6/1997 | Zavislan et al. ............. | 235/456 |
| 5,686,705 A | * | 11/1997 | Conroy et al. ........... | 178/18.05 |
| 5,732,222 A | | 3/1998 | Miyagawa et al. | |
| 6,250,548 B1 | | 6/2001 | McClure et al. | |
| 2003/0062411 A1 | * | 4/2003 | Chung et al ................. | 235/385 |
| 2003/0162162 A1 | * | 8/2003 | Marggraff .................... | 434/410 |

FOREIGN PATENT DOCUMENTS

EP       0573136       * 12/1993

OTHER PUBLICATIONS

ABCNEWS.com, "Does Technology Hold Key to Accurate Voting?", http://my.abcnews.go.com/PRINTERFRIEND-LY?PAGE=http://abcsource.starwave.com/, printed Nov. 15, 2001, (copyright 2000) ABC News Internet Ventures, 4 pgs.
Inventors, "The History of Voting Machines—History of the Voting System Standards Program", http://inventors.about-.com/library/weekly/aa111300b.htm, printed Nov. 15, 2001, 8 pgs.

* cited by examiner

*Primary Examiner*—Daniel St.Cyr
(74) *Attorney, Agent, or Firm*—Townsend and Townsend and Crew LLP (57) ABSTRACT

A voting apparatus includes a print media receiving unit including a surface suitable for receiving a printed medium containing a list of two or more choices. An electronic position determining system is associated with the print media receiving unit. The electronic position determining system is capable of determining a position of a selection of the two or more choices on the print medium when the print medium is disposed on the surface. An information storage medium in the voting apparatus is capable of storing the selection.

10 Claims, 6 Drawing Sheets

VOTING APPARATUS AND METHOD

RELATED APPLICATIONS

This patent application claims the benefit of U.S. Provisional Patent Application No. 60/258,097, filed Dec. 22, 2000. This U.S. Provisional Patent Application is herein incorporated by reference in its entirety for all purposes.

BACKGROUND OF THE INVENTION

Many types of voting apparatuses and systems exist. Examples of existing voting machines and systems include paper ballot systems, mechanical lever voting systems, punchcard systems, and DRE (direct recording electronic) systems.

Paper ballot systems use paper ballots listing the names of the candidates and issues for voting. A voter records a choice, in private, by marking the box next to a candidate or issue they want to select, and the marked ballot is deposited in a sealed ballot box.

Mechanical lever voting machines have also been used to record votes. In these machines, the name of each candidate or ballot issue choice is assigned a particular lever in a rectangular array of levers on the front of the machine. A set of printed strips visible to the voters identifies the lever assignment for each candidate and issue choice. The levers are horizontal in their unvoted positions. In a private enclosure, the voter manipulates one or more levers corresponding to the voter's choices to vote. When the voter exits the booth by opening a privacy curtain with the handle, the voted levers automatically return to their original horizontal position. As each lever returns, it causes a connected counter wheel within the machine to turn one-tenth of a full rotation. The counter wheel, serving as the "ones" position of the numerical count for the associated lever, drives a "tens" counter one-tenth of a rotation for each of its full rotations. The "tens" counter similarly drives a "hundreds" counter. If all mechanical connections are fully operational during the voting period, and the counters are initially set to zero, the position of each counter at the close of the polls indicates the number of votes cast on the lever that drives it. Interlocks in the machine prevent the voter from voting for more choices than are permitted.

Punchcard systems employ a card and a small clipboard-sized device for recording votes. A voter punches a hole in the card (with a supplied punch device) opposite a candidate or ballot issue of the voter's choice. After voting, the voter may place the ballot in a ballot box for later tabulation. Alternatively or additionally, the ballot may be fed into a computer vote-tabulating device at the voter's precinct.

One common type of punchcard is the "votomatic" card. In a votomatic card, the locations at which holes may be punched to indicate votes are assigned numbers. These locations are referred to as "chads" and are perforated regions that can be punched out. The number of each hole is the only information printed on the card. The list of candidates or ballot issue choices, and directions for punching the perforated regions are printed in a separate booklet that is on top of the votomatic card.

The year 2000 presidential election between Al Gore and George Bush, Jr. highlighted the problems associated with votomatic voting machines. These problems are well documented For example, in a votomatic machine, the appropriate holes in the ballots may not be punched cleanly resulting in hanging chads or pregnant chads. The voter's intent is not easily discernable unless the chads are cleanly punched. Also, voters sometimes find the votomatic machines confusing. In the year 2000 presidential election, for example, many voters complained that they had intended to vote for one candidate, but ended up voting for another because the votomatic machine was confusing. Lastly, as evident from the long vote counting process in the 2000 presidential election, counting votomatic ballots can be laborious and slow if the counting is performed manually.

DRE systems are an electronic implementation of the old mechanical lever systems. As with the lever machines, there is no ballot. In a DRE system, the possible choices are visible to the voter on the front of the machine The voter directly enters choices into electronic storage with the use of a touch-screen, push buttons, or similar device. An alphabetic keyboard is often provided with the entry device to allow for the possibility of write-in votes. Since votes are stored electronically, votes can be quickly tabulated.

While conventional DRE voting systems address many of the problems associated with votomatic voting machines, improvements could be made. For example, conventional DRE voting systems such as touch screen voting machines are purely electronic and are essentially paperless systems. In some Jurisdictions (e.g., New Hampshire), paper ballots are required by law so that conventional DRE systems may not be appropriate for these jurisdictions. Also, although the use of electronics in society increases every day, many voters may still feel more comfortable using paper as a voting medium. For example, even if all votes are recorded electronically, some voters may fear that it is easier to electronically alter an electronic ballot than a paper ballot. Also, print media is easier to read than electronic media (e.g., on computer screens). Consequently, although such DRE systems are currently being used in some jurisdictions, such conventional DRE systems may not gain widespread acceptance. Thus, while purely electronic voting methods have advantages, they also have disadvantages.

Accordingly, embodiments of the invention address these and other problems, individually and collectively.

SUMMARY OF THE INVENTION

Embodiments of the invention are directed to voting apparatuses, voting methods and voting systems.

One embodiment of the invention is directed to a voting apparatus comprising: (a) a print media receiving unit including a surface suitable for receiving a print medium containing two or more choices; (b) an electronic position determining system capable of determining a position of a selection of the two or more choices on the print medium when the print medium is disposed on the surface; and (c) an information storage medium capable of storing the selection.

Another embodiment of the invention is directed to a voting apparatus comprising: (a) a print media receiving unit including a surface suitable for receiving a print medium containing two or more choices; (b) an electronic position determining system capable of determining a position of a selection of the two or more choices on the print medium when the print medium is disposed on the surface, the electronic position determining system including (i) a plurality of signal transmitting elements under the surface, (ii) a processor operatively coupled to the plurality of signal transmitting elements, (iii) a memory including electronic maps containing the choices and the locations of the choices in the print medium, and (iv) a stylus coupled to the print media receiving unit, wherein the stylus includes a signal receiving element; and (c) an information storage medium capable of storing the selection.

Another embodiment of the invention is directed to a voting system comprising: a voting apparatus; a client computer adapted to receive a vote from the voting apparatus; and a server computer in operative communication with the client computer for receiving the vote from the client computer, and for tabulating the vote along with other votes.

Other embodiments of the invention are directed to systems and methods using the above-described voting apparatus embodiments and other embodiments.

These and other embodiments of the invention can be described with reference to the Figures and the Detailed Description.

DETAILED DESCRIPTION

The voting apparatuses, systems, and methods according to embodiments of the invention may be used in any suitable type of activity that uses voting. For example, embodiments of the invention can be used in national, state, and local elections (e.g., for officials for public office), referendums, and elections in smaller organizations (e.g., union elections, high school elections, etc.). Embodiments of the invention can also be used for less "official" voting activities including voting on matters such as favorite sports teams, athletes, movie stars, etc.

One embodiment of the invention is directed to a voting apparatus comprising a print media receiving unit including a surface suitable for receiving a print medium. The print medium may have a plurality of choices from which the voter may make a selection. The choices may include a plurality of candidates or possible choices associated with a particular issue (e.g., as in a referendum). An electronic position determining system in the voting apparatus and a page detection system determines a position of a selected choice in the print medium. The position may include the page on which the selected choice is printed and the X and Y coordinates of that choice on the page. Using the position information, a processor in the electronic position determining system determines which choice was selected by the voter. Then, the processor stores the selected choice in an information storage medium or another suitable memory device.

In some embodiments, the voter's selection can then be transferred from the information storage medium (or other memory device) to a server computer via a communication medium such as the Internet. The server computer may be at a remote location and may be used to tabulate the voter's vote with other votes. The server computer may also run a Website which can display the tabulated votes.

Figure 1:
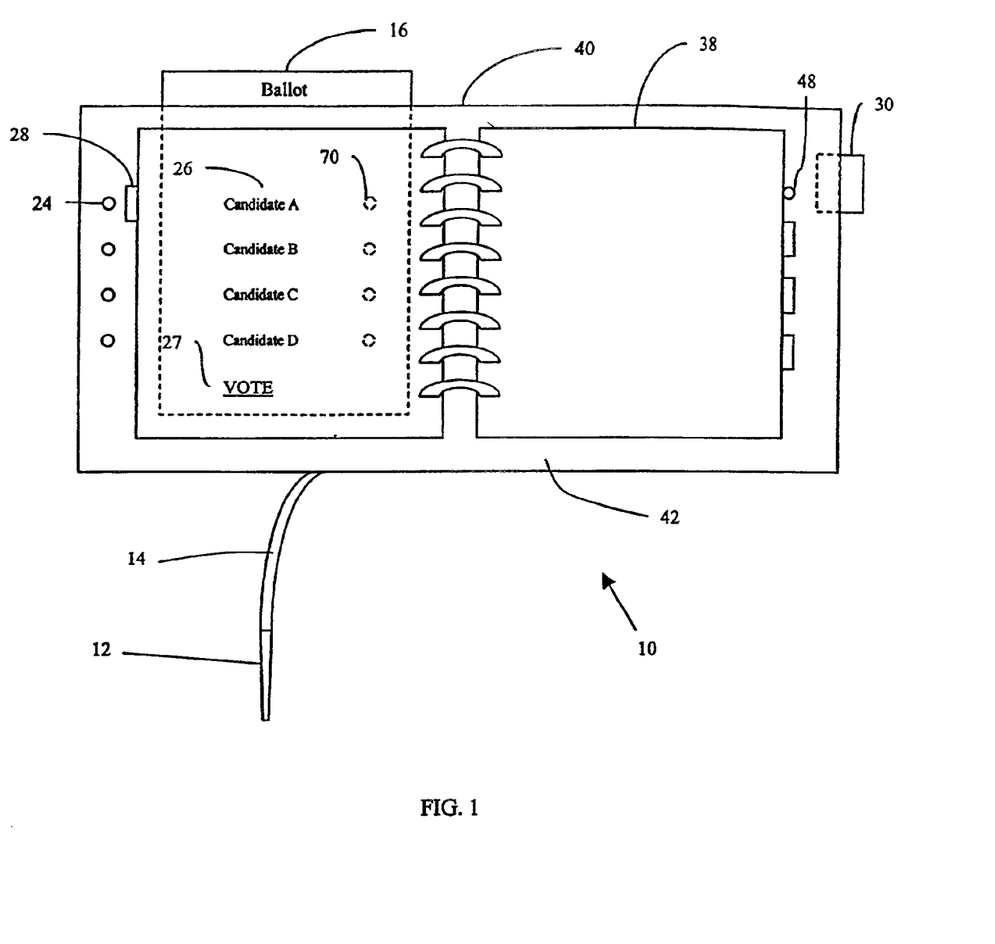
FIG. 1 shows a plan view of a voting apparatus according to an embodiment of the invention.

FIG. 1 shows a voting apparatus 10 according to an embodiment of the invention. The voting apparatus 10 includes a print media receiving unit 40 including a surface 42 capable of receiving a print medium 38. The print media receiving unit 40 may include a housing, which houses various components of an electronic position determining system. In some embodiments, the housing may be made of molded plastic.

In the illustrated example, the surface 42 of the print media receiving unit 40 is planar. However, in other embodiments, the surface 42 can be non-planar. For example, the surface which receives the print medium could be three-dimensional (e.g., curved) in some embodiments.

Any suitable print medium may be used in embodiments of the invention. In the illustrated example, the print medium 38 is in the form of a book with a ring-type binder. The print medium 38 can be in the form of a book (e.g., with a spiral, ring, or solid binder), or could be in the form of a single sheet. Typically, the print medium 38 comprises paper, but the print medium 38 could comprise plastic, cardboard, or any other type of material.

As shown, the print medium 38 has a list including a plurality of choices 26, which can be selected by the voter. In this example, the choices printed on the print medium 38 include Candidates A, B, C, and D. The print medium 38 also includes a vote block 27 with the word "vote" printed on the print medium 38.

The print medium 38 can be attached (e.g., temporarily attached) to the surface 42 or may be removably disposed on the surface 42. In some embodiments, to help inhibit the lateral movement of the print medium 38, the surface 42 can be cooperatively structured to receive the print medium 38. For example, raised borders (not shown) may coincide with the edges of the print medium on the surface so that the borders restrict the print medium's lateral movement. Print media receiving units with raised borders are described in further detail in U.S. patent application Ser. No. 09/777,262, entitled "Print Media Receiving Unit Including Platform and Print Media", filed Feb. 5, 2001. This U.S. Patent Application is herein incorporated by reference in its entirety. Alternatively or additionally, the print medium 38 could be secured to the surface 42 using clips, ring binders, adhesives, etc. Whatever mechanism is used to secure the print medium 38 to a fixed location, the print medium 38 on the surface is permanently or temporarily fixed with respect to the surface 42.

A ballot 16 may be present in a cooperatively structured slot (not shown) in the print media receiving unit 40. The ballot 16 may be under the surface 42 and under the print medium 38. Suitable electronics may be included in the print media receiving unit 40 so that it automatically detects the presence of the ballot 16 when it is inserted in the print media receiving unit 40. The electronics may also automatically detect the withdrawal of the ballot 16 from the print media receiving unit 40 so that the voting apparatus 10 knows that the voter is finished voting.

The ballot 16 may be of the type that is currently used in conventional punchcard voting machines (e.g., a card used in a votomatic voting machine). The ballot 16 may comprise marked or unmarked paper. In some embodiments, the ballot 16 may contain perforated regions 70 (e.g., chads) that can be punched out. An internal punching mechanism (not shown) may punch the perforated regions 70 to record a selection in the ballot 16. Alternatively, holes could be provided in the print medium 38 and in the surface 42. The stylus 12 could be used punch the perforated regions 70 in the ballot 16. This embodiment is described in further detail below with reference to FIG. 2.

The voting apparatus 10 also includes an electronic position determining system. One or more components of the electronic position determining system may be housed in the print media receiving unit 40 or may be external to the print media receiving unit 40. For example, the print media receiving unit 40 may have a housing that houses a plurality of electrical elements, a processor (e.g., a microprocessor), and a memory that contains electronic maps that relate the choices printed in the print medium 38 to their positions within the print medium 38. In other embodiments, the memory and/or the processor in the electronic position determining system could be external to the housing of the print media receiving unit 40.

In some embodiments, the electronic position determining system can include a plurality of electrical elements under the surface 42. The plurality of electrical elements can form array of regions that can provide or receive unique signals or combinations of signals corresponding to the different regions. In preferred embodiments, the array of electrical elements is an array of signal transmitting elements. Each signal transmitting element in the array transmits a different signal that is received by a stylus 12 when it is over the signal transmitting element. A processor (e.g., a microprocessor) and a memory containing a database may be may be coupled to both the stylus 12 and the signal transmitting elements. The database may contain electronic maps that correlate position information to voting choices.

In other embodiments, pressure-sensitive electronic position determining systems can be used. For example, the plurality of electrical elements could comprise two perpendicular sets of wires (or traces) under the surface supporting a print medium with voting choices. The two sets of wires can be separated by a dielectric medium such as a compressible foam. A unique signal can be associated with each intersection formed by the overlapping sets of wires (or traces). For example, a voter can press a choice in a print medium on the surface of a print media receiving unit. Two intersecting X and Y wires (or traces) underneath the choice can be activated after the voter presses the choice. For example, pressing the choice in the print medium can electrically couple the intersecting wires underneath the depressed choice (e.g., by capacitive coupling or by physical contact). A processor can determine which two intersecting wires are activated and can thus determine which position on the surface the user depressed. The processor can then determine which choice was selected by the voter.

In other embodiments, optical elements could be used in the electronic position determining system. For example, an optical system could have a grid of optical light beams defining a crossing pattern over a planar surface, with corresponding photoreceptors indicating the receipt of each light beam. A print medium with a list of choices may be present under the grid of optical light beams. A light blocking member such as a stylus or finger can be used to select a candidate by blocking certain light beams. An X direction position circuit and a Y direction position circuit in the print media receiving unit 40 can detect the relative coordinates of the blocked light beams, to thereby provide information for a processor to determine the position of the light blocking member.

In some embodiments, a stylus 12 may be included in the electronic position determining system. In FIG. 1, for example, the stylus 12 is mechanically and electrically coupled to the print media receiving unit 40 through a cable 14. The stylus 12 may include a conductive element. The conductive element in the stylus 12 may be adapted to transmit signals to or receive signals from electrical elements underneath the surface 42 of the print media receiving unit 40. For example, in some embodiments, the stylus 12 may comprise a signal receiving element such as a receiving antenna, while the electrical elements under the surface 42 are signal transmitting elements such as transmitting antennas or finger elements coupled to transmitting antennas.

A plurality of selection indicators 24 is disposed to a side of the print medium 38. In this example, four lights (e.g., for light emitting diodes or LEDs) may be associated with the four candidates A–D. If a voter selects, for example, the aperture associated with Candidate A, then a light associated with Candidate A would subsequently illuminate. This provides nearly instantaneous feedback to the voter that the voter just voted for Candidate A. The voter would thus be able to visually confirm the candidate selection made by the voter.

Other visual output devices, or even audio output devices, may also be present in the voting apparatus 10. The output devices could display information on the candidates or on the issues being voted upon, the particular selection made by the voter (e.g., for confirmation purposes), greeting messages, thank you messages, etc. For example, an audio jack or a speaker may be incorporated in or operatively associated with the print media receiving unit 40. Earphones could be coupled to the audio jack so that the voter can listen to audio information. The use of earphones or other audio devices is useful for voters who might have impaired vision (e.g., blind voters). To provide for synthesized audio, a speech synthesizer chip can be included in the print media receiving unit 40. In yet other embodiments, a display device (e.g., a monitor, LCD, etc.) may be operatively coupled to the print media receiving unit 40 or could be incorporated in the print media receiving unit 40.

A transferable information storage medium 30 may be present in the voting apparatus 10 to record the voter's selection. The transferable information storage medium 30 may be an electronic, electro-optic, or magnetic data storage medium. In some embodiments, the transferable information storage medium 30 may include an electrically erasable read only memory (EEPROM) or a non-electronically erasable read only memory (EPROM). It may be in any suitable form including a memory cartridge, disk, stick, etc. Data cartridges are preferred as they are easy for voters to manipulate. In some embodiments, the data cartridges may be flash memory cartridges. In the illustrated example, the information storage medium 30 is transferable and is insertable into a cooperatively structured recess in the side of the print medium receiving unit 40. The transferable information storage medium 30 could alternatively or additionally be insertable into a recess (not shown) at the upper surface of the print medium receiving unit 40.

Alternatively or additionally, an internal, non-transferable memory could also be included in the print media receiving unit 40. The non-transferable memory may comprise one or more memory chips (RAM or ROM chips), disk drives, etc. These internal memory devices can be used for, for example, storing voter selections, storing voting information, and storing computer code for operating the voting apparatus 10.

As noted above, the print medium 38 may comprise multiple pages listing the voteable matters and the choices associated with the voteable matters. An automatic page detection system in the voting apparatus 10 can automatically determine which page of the print medium 38 is currently being displayed to the user. For instance, a plurality of optical page detectors 48 may be disposed to a side of the print medium 38. In the illustrated example, the plurality of optical page detectors 48 can include optical receivers that receive a predetermined amount of light when a tab 28 is not covering the optical page detector 48. The predetermined amount of light may send a signal to a processor (not shown) inside of the print media receiving unit 40 and the processor may automatically determine that the page with Candidates A–D is currently being displayed to the user. Once a voter selects one of Candidates A–D, the processor can consequently determine which of the Candidates A–D the voter selected. The processor can then record the selection in the information storage medium 30 or an internal memory.

Other page detection mechanisms can be used in embodiments of the invention. For example, symbols (e.g., a green "Go" circle) could be printed on the pages of the print medium at different locations along the edges of the pages. These symbols could then be selected using a stylus or other selection device to inform the print media receiving unit that a particular page is currently being displayed to the voter.

In an illustrative method of using the voting apparatus in FIG. 1, a voter may insert the ballot 16 into the print media receiving unit 40. In some embodiments, the voting apparatus 10 can automatically activate after receiving the ballot 16. The voter may then open the print medium 38 to the first page. The print medium 38 may have one or more lists of choices for selection by the voter. The page detectors 48 send signals to a processor (not shown) inside of the print media receiving unit 40. The processor then automatically determines, which pages of the print medium 38 are currently being displayed to the voter.

The voter then may select one of Candidates A–D in the print medium 38 by touching one of them with the stylus 12. If, for example, the user selects Candidate A by touching the stylus 12 to Candidate A, the corresponding selection indicator 24 illuminates. Viewing the illuminated section indicator 24, the voter can then confirm that the voting apparatus 10 has correctly recognized the voter's vote. The voter can then select the vote block 27. The processor can then store the vote for Candidate A in the transferable information storage medium 30.

In this example, the voter's vote is recorded in two ways. First, the appropriate perforated regions 70 can be punched by the voting apparatus 10 after it receives the voter's vote. As noted above, an internal punching mechanism (not shown) can be used for this purpose. Second, the voting apparatus 10 can record the vote in the transferable information storage medium 30 or an internal, non-transferable memory. In either case, the voter's selection can be later transferred from the internal memory or the transferable information storage medium to a server or client computer. At the server or client computer, electronically stored votes can be quickly tabulated. In addition, the printed ballots 16 can also be saved. The printed ballots 16 can be tabulated in case the electronic vote count is contested or in case the computer system fails (e.g., a server crash).

The voting apparatus shown FIG. 1 has a number of advantages. For example, in the embodiments described, a voter's selections are stored both electronically and in a physical ballot. This can occur substantially simultaneously, thus saving time. The electronically stored selection can be tabulated with other electronically stored selections. Physical ballots (e.g., printed paper ballots) may be retained and may be used to verify that the electronically tabulated votes are accurate. Moreover, as noted above, some people are more comfortable with paper than electronics and some jurisdictions still require the use of paper ballots in voting. Embodiments of the invention may also be used in these jurisdictions while also using electronics to tabulate votes as well. In addition, the printed ballot (e.g., ballot 16 in FIG. 1) that is used may be of the same type used in conventional voting apparatuses (e.g., punch card-type voting apparatuses). Consequently, conventional ballot counting apparatuses can still be used and are not rendered obsolete. In addition, unlike the conventional votomatic voting machines, voting choices and other voting information can be provided to the voter in both audio and visual form so that a single voting apparatus can be used for both visually impaired voters and hearing impaired voters. All voters may participate in the voting process using the same voting apparatus, thus ensuring voting consistency with every person in the electorate.

Figure 2:
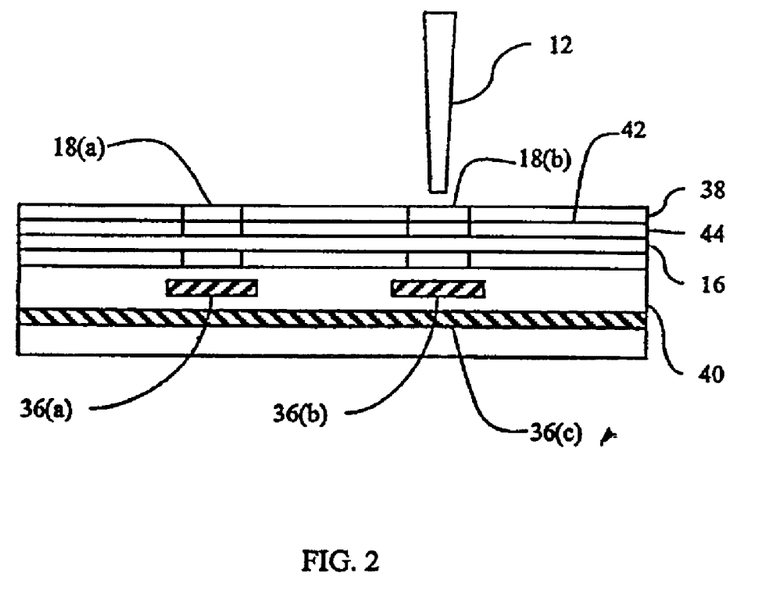
FIG. 2 shows a cross-sectional view of a portion of a voting apparatus according to an embodiment of the invention.

FIG. 2 shows a cross-sectional view of a portion of another voting apparatus embodiment. In this embodiment, the voting apparatus can be similar to the voting apparatus shown and described with respect to FIG. 1. However, in this embodiment, holes may be in the upper surface of the print media receiving unit and the print medium so that perforated regions in a ballot can be punched with a stylus.

Referring to FIG. 2, the print media receiving unit 40 may include an upper portion 44 with an upper surface 42. The upper portion 44 may be non-conductive. A print medium 38 with an aperture 18(*a*) associated with, for example, Candidate A and a second aperture 18(*b*) associated with, for example, Candidate B could be presented to the user. The print media receiving unit 40 includes three signal transmitting elements 36(*a*), 36(*b*), 36(*c*) under the surface 42. First and second signal transmitting elements 36(*a*), 36(*b*) are perpendicular to a third signal transmitting element 36(*c*). Each signal transmitting element 36(*a*), 36(*b*), 36(*c*) is adapted to transmit a different signal. In some embodiments, the different signals may be a function of the different voltages that are applied to the signal transmitting elements 36(*a*), 36(*b*), 36(*c*).

Illustratively, a voter may slide a ballot 16 into a slot in the print media receiving unit 40. A voter may select Candidate B by inserting the stylus 12 into the aperture 18(*b*) associated with Candidate B. As the voter inserts the stylus 12 into the aperture 18(*b*), the stylus 12 punches a hole (not shown) in the ballot 16 underneath the print medium 38. Like conventional punch cards, the voter's selection is recorded in the ballot 16. In addition, one or both of the signal transmitting elements 36(*b*), 36(*c*) transmits a unique signal that is received by the stylus 12, which comprises a signal receiving element (e.g., a receiving antenna). A processor (not shown) in communication with the stylus 12 and the signal transmitting elements 36(*b*), 36(*c*) determines the position of the voter's selection. Using the position information, the processor then determines that Candidate B was selected by the voter. The processor then stores the selection in a transferable information storage medium or other memory device for later tabulation with other votes. The selection is also recorded in the ballot 16.

Other embodiments are also possible. For example, instead of punching a hole in the ballot 16, the stylus 12 could comprise a marking instrument. The stylus 12 can mark on the ballot 16 instead of punching a hole in it. An optical reader could then tabulate the marked ballot 16 with other ballots like those used in standardized tests such as the SAT (scholastic aptitude test) exam.

Figure 3:
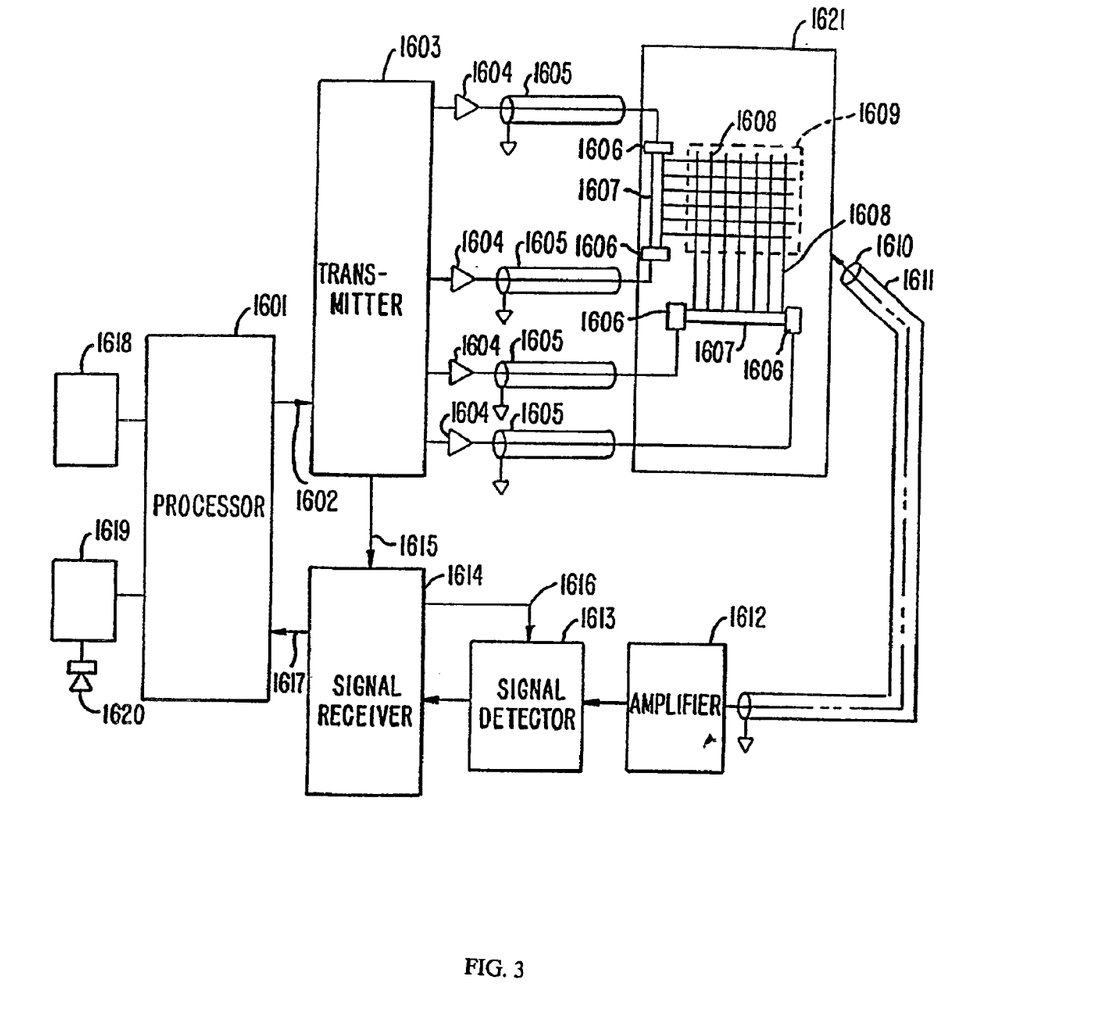
FIG. 3 shows a schematic diagram showing the various electronic components according to an embodiment of the invention.

FIG. 3 is a block diagram of a electronic position determining system including an antenna apparatus. Further details about systems of the type shown in FIG. 3 can be found in U.S. patent application Ser. Nos. 09/574,599 filed May 19, 2000, 60/200,960, filed May 1, 2000, and 60/200, 722 filed Apr. 27, 2000. Other suitable position determining systems are described in U.S. Pat. Nos. 5,575,659, 5,686, 705 and 5,877,458. All of these U.S. Patent Applications and U.S. Patents are herein incorporated by reference in their entirety for all purposes.

Referring to FIG. 3, a processor, preferably a microprocessor, 1601 regulates the operation of an active antenna apparatus 1621 and receives position data 1617 which it uses to determine the position of a stylus 1611 near active area 1609 proximate to finger elements of antenna apparatus 1621 (in this example, the signal transmitting elements may be referred to as "finger elements"). Processor 1601 also includes a user interface 1618 and an audio block 1619 for outputting an audio output via a speaker 1620.

The processor 1601 sends commands 1602 to transmitting logic block 1603 to cause a sequence of transmitting signals to perform a position detection function. The commands 1602 may include beginning and/or stopping position sensing. Additionally the commands 1602 may also be in regards to the desired resolution, i.e., commands 1602 may also include instruct transmitting block 1603 to adjust the mode of operation to achieve a desired resolution or speed for a particular application.

Transmitting block 1603 drives the signal transmitting elements of antenna apparatus 1621 according to a predetermined multi-state drive sequence. In a preferred embodiment, two antennas each having a resistive voltage divider strip are used. The antennas are driven using a five state drive algorithm. This algorithm and other features are described in further detail in U.S. patent application Ser. No. 09/574,599. The drive signals of transmitting logic block 1603 are preferably amplified with amplifiers 1604 and transmitted via wires having wire shielding 1605. Each antenna has two electrical contacts 1606 driving a resistive voltage divider 1607 that is used to supply the voltages to the fingers 1608 of each antenna.

Stylus 1610 has a conductive element, which receives the transmitted signals. A conductor with a ground shield 1611 conducts the received signals to a receiving amplifier 1612. The receiving amplifier 1612 may perform any conventional gain, filtering, and DC rejection function to amplify and condition the received signals. The conditioned signals are set to signal detection block 1613 that performs demodulation, analog to digital conversion, and optional integration. In a preferred embodiment, synchronous demodulation of a single frequency signal is used because this enhances the signal to noise ratio. However, synchronous demodulation requires timing signals 1615 and 1616 to coordinate the activities of signal detection block 1613. In a preferred embodiment, signal detection block 1613 integrates the signal to achieve narrow band filtering and uses a constant slope discharge technique to convert the integrated signal to a digital value for interpretation by the receive logic block 1614. The receive logic block 1614 directs the received signal detection process with receive timing signals 1616. When synchronous demodulation is used, transmit timing information 1615 is included with the receive timing signals 1616. The receive logic block 1614 accepts digital data from the receive signal detection block 1613 and formats the data as appropriate for delivery to processor 1601.

Figure 4:
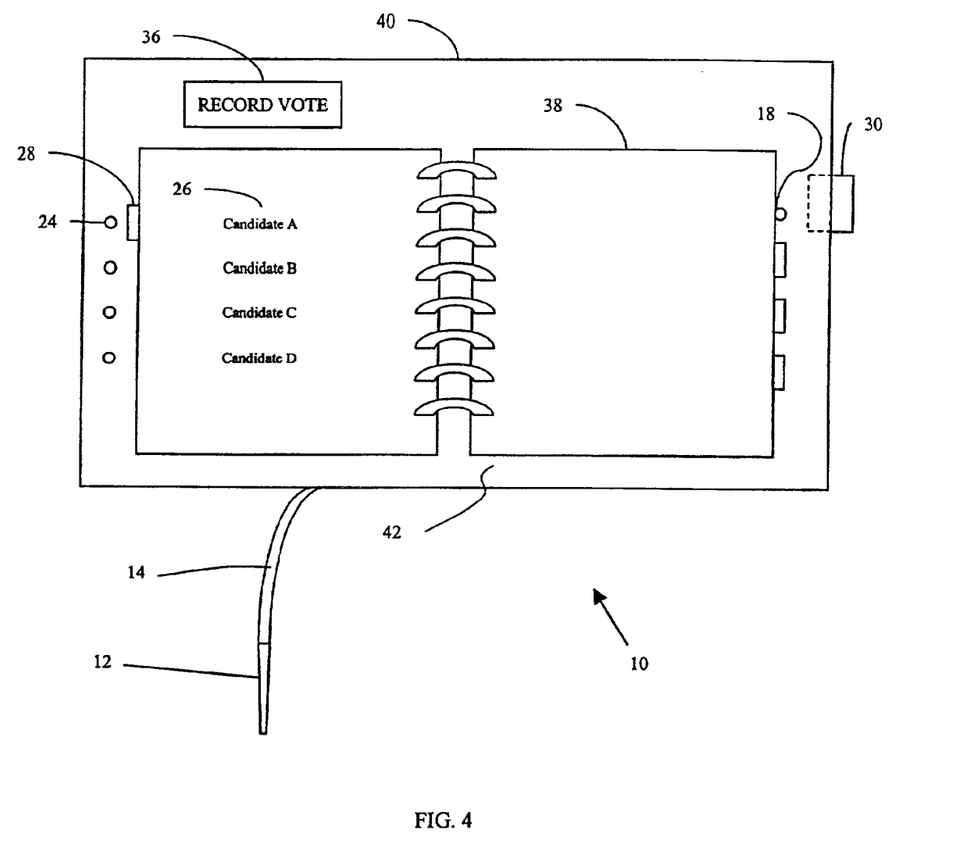
FIG. 4 shows a plan view of a voting apparatus according to another embodiment of the invention.

Another voting apparatus 10 according to an embodiment of the invention is shown in FIG. 4. In this and other Figures, like numerals designate like elements. However, in this embodiment, the ballot is not marked or punched. In this embodiment, the printed medium 38 can be considered the voting ballot. The voter can select one of Candidates A–D printed on the print medium 38. The electronic position determining system can then determine, as described above, which of Candidates A–D the voter selected. The selection indicator 24 may provide the voter with feedback as to the selection made. Once the user is assured that the correct selection has been made, the user may press a record "vote" button 36 to indicate that the vote is to be recorded in the information storage medium 30. The "record vote" button 36 could be a depressible button. The selection of the "record vote" button 36 could cause the processor in the print media receiving unit 40 to record the voter's vote by storing it in memory.

Figure 5:
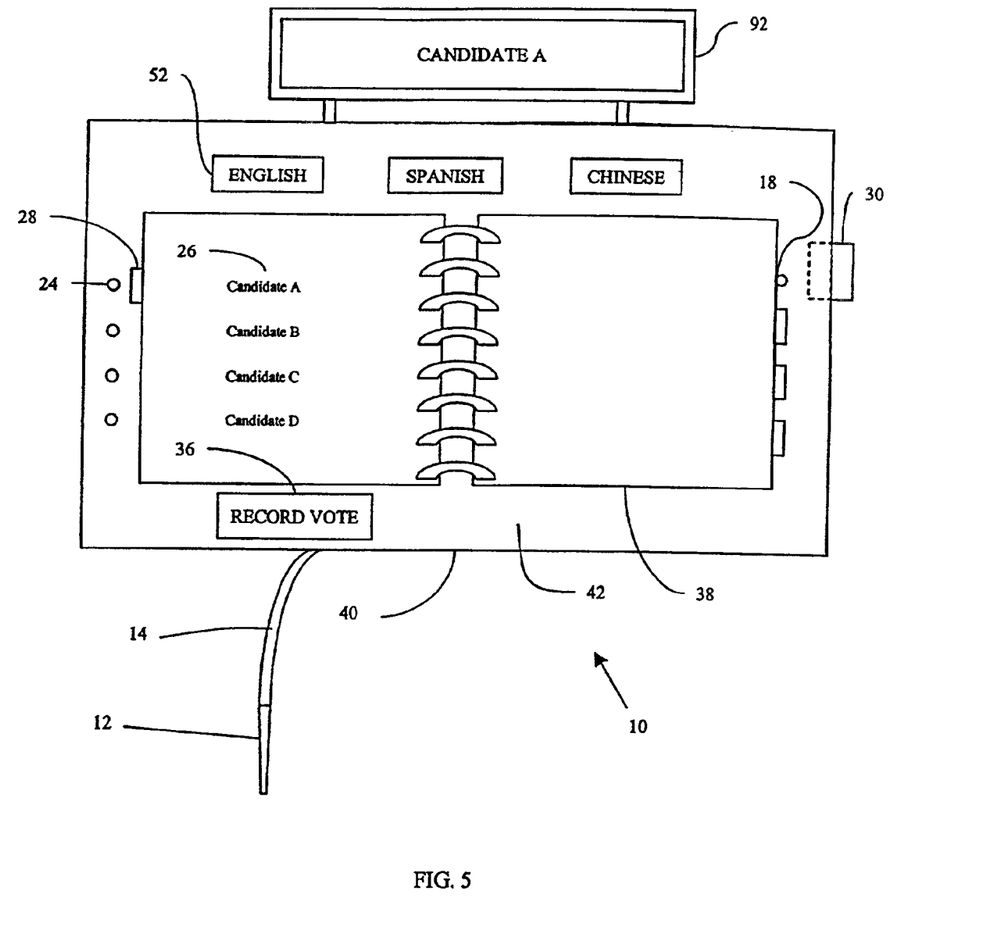
FIG. 5 shows a plan view of a voting apparatus according to another embodiment of the invention.

Another voting apparatus embodiment is shown in FIG. 5. In FIG. 5, the voting apparatus 10 is similar to the previously described voting apparatuses, but this voting apparatus 10 includes language selection buttons 52 that can be used to select a language and also includes a display device 92. The display device 92 could be a liquid crystal display (LCD) screen, or a cathode ray tube (CRT) display.

The language selection buttons 52 can correspond to any suitable language. The language selection buttons 52 could be depressible buttons. Activation of a particular language selection button causes the voting apparatus 10 to communicate with the voter in the selected language. The names of the languages could alternatively be printed on the print medium 38 or on the surface 42. The printed language names could then be selected using, for example, the stylus 12. Suitable languages include German, Spanish, Chinese, Vietnamese, etc.

Prior to voting, the voter may select may select the appropriate language selection button 52. Then, voting instructions and vote confirmation messages may be displayed on the display device 92 that is coupled to the print media receiving unit 40. The displayed messages may be in the language that the voter selected.

The voting apparatuses 10 shown in FIGS. 4 and 5 have a number of advantages. Since the printed medium 38 is the ballot, the voter can study the actual ballot that will be used prior to coming to the voting location. After the voter gets to the voting location, the voter is already familiar with the contents of the ballot and its format. The voter need not become instantly familiarized with a strange document on the day of voting. This ensures that the voter will not be caught off guard with an unfamiliar ballot when the voter votes. Moreover, since the voter will have an opportunity to review the contents of the actual ballot prior to voting, the voter may review choices that the voter may not have otherwise reviewed. Also, since the voter is more familiar with the ballot prior to voting, the voting process may proceed more quickly as each voter need not take the time to become familiar with the format of the ballot. Embodiments of the invention can thus ensure that the electorate's voting intent is more accurately captured by the voting process, and can also speed up the voting process.

Voting systems according to embodiments of the invention can be described with reference to FIG. 6. The voting system includes a voting location 150 where voting can take place. The voting location 150 may be, for example, a voting precinct. A server computer 100 at a host location 112 is in communication with a client computer 104 at the voting location 150 through a communication medium 102. The host location 112 and the voting location 150 can be remotely located with respect to each other. For purposes of illustration, only one voting location 150 is shown. It is understood that there may be many voting locations in embodiments of the invention. Votes from various locations may be tabulated electronically by the server computer 100.

The server computer 100 and the client computer communicate through a communication medium 102 such as the Internet, and more particularly the World Wide Web (WWW). Typical communication protocols that can be used by the server computer 100, and the client computer may include HTTP (hypertext transfer protocol), TCP/IP (terminal communication protocol/Internet protocol), or other protocol.

The server computer 100 is typically a powerful computer or cluster of computers. For example, the server computer can be a large mainframe, a minicomputer cluster, or a group of servers functioning as a unit. In one example, the server computer may be a database server coupled to a Web server. The server computer can behave as a single computer that services the requests of one or more client computers. For example, one or more client computers at different user sites can communicate with the server computer 100 through the communication medium 102 and optionally through one or more Internet Service Providers (ISPs) (not shown). Client computers typically have less memory and less computing power than server computers.

The server computer 100 can have computer code for performing any suitable function. For example, the server computer 100 can have code for tabulating votes sent from various voting locations (e.g., voting precincts), generating reports and performing statical analyses, and retrieving and sending content for the voting apparatuses 110(a), 110(b). Such content may include, for example, audio or visual information about voting procedures, candidates, etc.

A voting area 126 may also be present at the voting location 150. The voting area 126 includes two voting stations 126(a), 126(b). Each voting station 126(a), 126(b) may comprise a voting booth. Each voting station 126(a), 126(b) may also include a voting apparatus 110(a), 110(b). Any of the above described voting apparatuses can be used at the voting stations 126(a), 126(b). Each voting apparatus 110(a), 110(b) may include a transferable information storage medium 130 that is received in a recess in the print media receiving units of the voting apparatuses 110(a), 110(b).

A voter management area 140 may also be present at the voting location 150. At the voter management area 140, precinct workers can hand out the transferable information storage media 130 to the voters before they enter the voting stations 126(a), 126(b), check whether the voters are registered, and verify the identity of the voters.

the voter management area 140 may include reset modules 136(a), 136(b) that are adapted to receive the transferable information storage media 130 that are in the voting apparatuses 126(a), 126(b). The modules 136(a), 136(b) may comprise a processor and an internal memory. The voters' votes may be stored in the internal memory when the transferable information storage media 130 are inserted in the modules 136(a), 136(b). Later, the votes can be retrieved from the modules 136(a), 136(b) by inserting a supervisory transferable information storage medium into the modules 136(a), 136(b). Alternatively, the votes may be transferred from the modules 136(a), 136(b) to other computational apparatuses through wireless links or cables.

Figure 6:
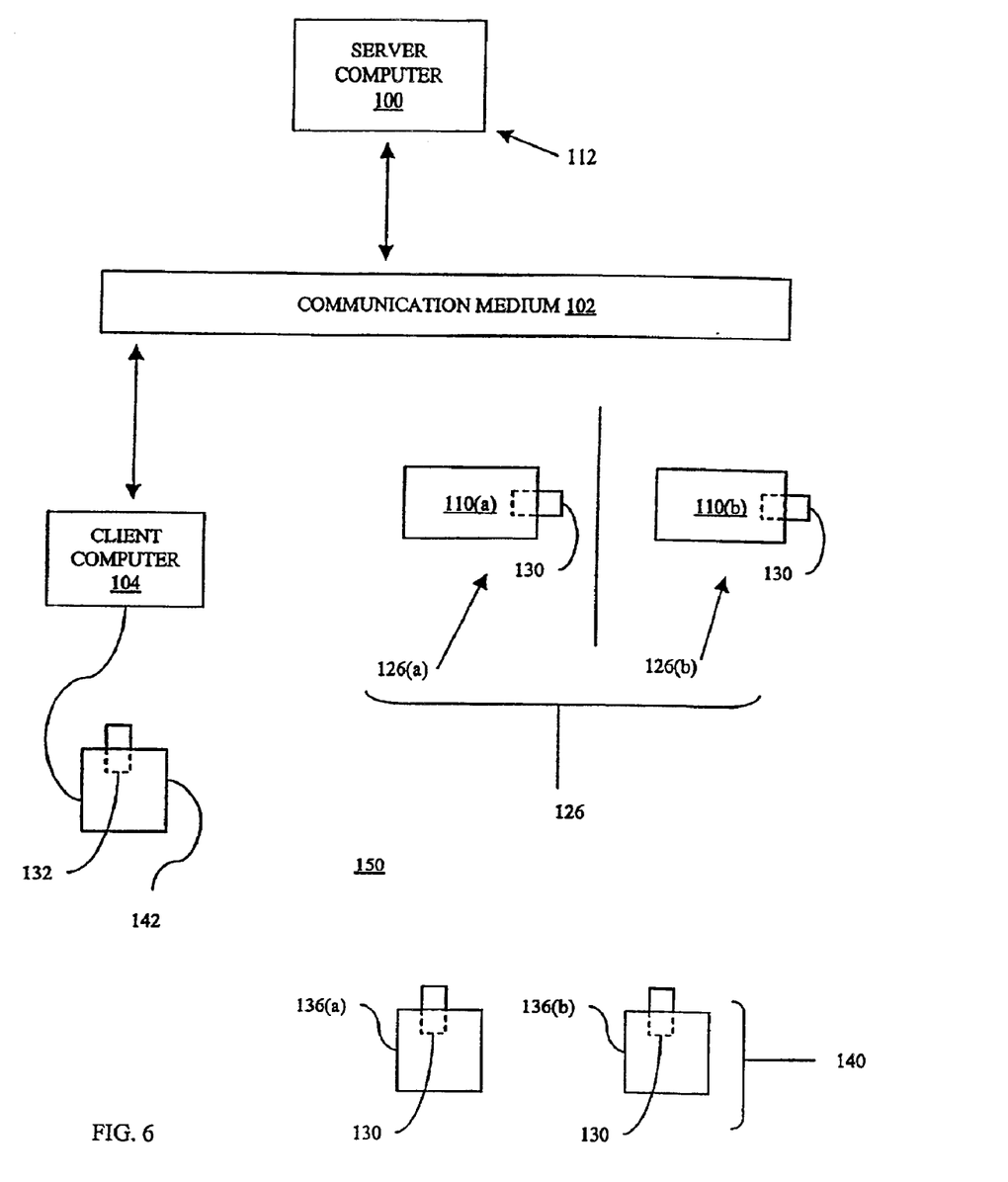
FIG. 6 shows a block diagram of a voting system according to an embodiment of the invention.

An illustrative method for using the system shown in FIG. 6 can be described. In the illustrative method, a voter can first go to the voter management area 140. At the voter management area 140, the voter can sign appropriate forms, show appropriate identity, etc. Then, the voter get a transferable information storage medium 130 from a precinct worker at the voter management area 140.

After receiving the transferable information storage medium 130, the voter then goes to a voting station 126(a) and inserts the transferable information storage medium 130 into the print media receiving unit of the voting apparatus 110(a). The voting station 126(a) and/or the voting apparatus 110(a) may comprise appropriate partitions to form a voting booth for privacy. In some embodiments, the insertion of the transferable information storage medium 130 into the print media receiving unit activates the voting apparatus 110(a), so that the transferable information storage medium 130 can act as a "key" that provides voting access.

The voter can then vote with the voting apparatus 110(a) as described above. In some embodiments, the voting apparatus 110(a) allows for only a single vote for any particular office or issue (i.e., no over votes). If something is left unvoted for on a page, the voting apparatus 110(a) can inform the voter of this. For example, appropriate audio or visual indicators (e.g., lights, messages) can inform the voter that some votes have not been cast. In some embodiments, the voter may then provide feedback (e.g, through a button on the print media receiving unit) to the voting apparatus 110(a) to ensure that any undervoting is purposeful.

After the voter is finished voting, the voter can take the transferable information storage medium 130 out of the print media receiving unit of the voting apparatus 110(a). After taking the transferable information storage medium 130 out of the print media receiving unit, the votes in the transferable information storage medium 130 can be temporarily locked so that the voter may not vote with it again.

After voting, the voter can give the transferable information storage medium 130 back to the precinct worker at the voter management area 140. The voter may then be given some documentation indicating that they have voted (as a receipt).

For the next voter, the transferable information storage medium 130 can be reset by the precinct worker so that the next voter can vote with it. For example, the precinct worker can put the transferable information storage medium 130 in the recess in the module 136(a) to reset the transferable information storage medium 130 for the next voter and/or transfer the voter's choices to a memory in the module 136(a).

At the end of the voting day or periodically, votes can be collected from the modules 136(a), 136(b) and then transferred to the client computer 104. In one embodiment, a supervisor transferable information storage medium 132 can be used. The supervisor transferable information storage medium 132 can be inserted into each of the modules 136(a), 136(b) to retrieve the votes collected in each module 136(a), 136(b). Then, the supervisory transferable information storage medium 132 can be inserted into a supervisor module 142, which is operatively coupled to the client computer 104. Using appropriate passwords and other security measures, the client computer 104 can then transmit the votes collected at the precinct to the server computer 112 via the communication medium 102.

Also, at the end of the day or periodically, a tally of votes can be printed out on a printer (not shown) at the voting location 150. Printed documents of vote tallies can be produced periodically or at the end of the day as yet another way to record vote totals. Printed vote totals may be saved in case the voting process needs to be audited or if a later vote total is challenged.

At the server computer 112, votes from other precincts can be collected and the collected votes can be tabulated quickly, efficiently, and accurately. Election results could be posted on a Web site (not shown) on the server computer 112. The public may thereafter access the Web site to view the results of the election.

The system embodiments of the invention have a number of advantages. For example, the voters' votes can be stored in a variety of places in the system shown in FIG. 6. For instance, a voter's vote may be stored in internal memories in the print media receiving units of the voting apparatuses 110(*a*), 110(*b*), the transferable information storage media 130, and the modules 136(*a*), 136(*b*). In addition, if paper ballots are used (as in the embodiments described with respect to FIG. 1), votes can also be recorded in paper ballots. Thus, in embodiments of the invention, votes can be stored in a variety of locations in the system. Vote totals can be checked and rechecked using the votes stored at the different locations, thus ensuring accuracy in the final vote tally.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention. For example, although the voting apparatus embodiment shown in FIG. 1 does not show a "record vote" button like the embodiment shown in FIG. 4, it is understood that the embodiment in FIG. 1 could also have a "record vote" button. Any combination of specifically described elements is within scope of the invention.

What is claimed is:

1. A voting apparatus comprising:
   (a) a print medium for an election, the print medium having two or more choices;
   (b) a print media receiving unit including a surface suitable for receiving the print medium;
   (c) a stylus coupled to the print media receiving unit;
   (d) an electronic position determining system capable of determining a position of a selection of the two or more choices on the print medium when the print medium is disposed on the surface, the electronic position determining system including a processor, a first antenna under the surface of the print media receiving unit and electrically coupled to the processor, and a second antenna in the stylus and coupled to the print media receiving unit via an electrical cable; and
   (e) an information storage medium capable of storing a selection of the voter.

2. The voting apparatus of claim 1 wherein the first antenna transmits a signal to the second antenna through the surface and the print medium during voting.

3. The voting apparatus of claim 1 further comprising a plurality of language selection buttons representing different languages.

4. The voting apparatus of claim 1 further comprising a visual output device coupled to the processor, wherein the visual output device is adapted to display the selection to the voter.

5. The voting apparatus of claim 1 wherein the information storage medium is a transferable information storage medium.

6. The voting apparatus of claim 1 further comprising an automatic page detection system for determining which page of the print medium is currently being displayed to the user.

7. The voting apparatus of claim 1 wherein the voting apparatus is capable of being automatically activated after the print media receiving unit receives the print medium.

8. The voting apparatus of claim 1 wherein the print medium comprises perforated regions that can be punched with the stylus.

9. The voting apparatus of claim 1 wherein the print media receiving unit further comprises a record vote button.

10. The voting apparatus of claim 1 further comprising an LCD display device operatively coupled to the processor.

* * * * *